United States Patent [19]
Baldur

[11] Patent Number: 5,633,717
[45] Date of Patent: May 27, 1997

[54] METHOD FOR MONITORING AND ADJUSTING THE POSITION OF AN OBJECT UNDER OPTICAL OBSERVATION FOR IMAGING

[75] Inventor: Roman Baldur, Quebec, Canada

[73] Assignee: Forensic Technology Wai Inc., Montreal, Canada

[21] Appl. No.: 672,263

[22] Filed: Jun. 26, 1996

[51] Int. Cl.$^6$ .................................................. G01B 11/14
[52] U.S. Cl. ............... 356/375; 250/559.29; 250/559.38
[58] Field of Search .................................. 356/375, 376; 250/559.29, 559.38, 559.22

[56] References Cited

U.S. PATENT DOCUMENTS

| | | | |
|---|---|---|---|
| 5,231,470 | 7/1993 | Koch | 356/376 |
| 5,379,106 | 1/1995 | Baldur | 356/375 |

Primary Examiner—F. L. Evans
Attorney, Agent, or Firm—Fishman, Dionne, Cantor & Colburn

[57] ABSTRACT

To image a surface of an object more efficiently using automatic positioning of the object with respect to the optical axis of a camera while keeping the surface of the object at a predetermined angular orientation with respect to the optical axis, a general shape of the object is first measured and a mathematical function approximating the surface is determined. Relative displacements and orientations for an imaging path are then calculated and the object is manipulated along the imaging path while being imaged with the surface of the object being at the predetermined angular orientation. The speed and accuracy of surface imaging is improved.

20 Claims, 4 Drawing Sheets

FIG_1

FIG_2

FIG_3

METHOD FOR MONITORING AND ADJUSTING THE POSITION OF AN OBJECT UNDER OPTICAL OBSERVATION FOR IMAGING

FIELD OF THE INVENTION

The present invention relates to a method and apparatus for imaging a surface of a three-dimensional object by automatically manipulating a relative displacement and orientation between the surface of the three-dimensional object and a camera used for imaging the surface. The invention relates more particularly to such a method in which the surface of the three-dimensional object is imaged by imaging a plurality of segments of the surface with a predetermined angular orientation between the surface at the segments and an optical axis of the camera.

BACKGROUND OF THE INVENTION

It is known in the art to use optical methods to obtain surface characteristic information about a three-dimensional object by imaging segments of the surface for the purposes of compiling the image information to obtain a greater "picture" of the surface. Examples of surface characteristics which are desirably imaged for analysis purposes are the imaging of striations formed on the land and groove surfaces of a fired bullet for forensic analysis purposes, molded articles (from plastic, metal diecast or even medical tablets) to determine the origin of the molded article from the analysis of mold created markings on the object, and other objects (typically metal) whose detailed surface may exhibit signs of fatigue used in non-destructive testing analysis.

In imaging three-dimensional objects, the quality of the analysis is highly dependent on the quality of the images of the surface. In turn, the quality of the surface images are typically dependent on optical characteristics such as lighting, focus and the angle of the object surface with respect to the optical axis of the camera. For this reason, it is desirable to adjust the position of the object under optical observation such that its surface at the point of imaging is perpendicular to the optical axis of the camera. In the mentioned U.S. Pat. No. 5,379,106 granted Jan. 3, 1995 to Applicant, an apparatus for monitoring and adjusting the position of an object under optical observation is disclosed in which the object is mounted with sufficient degrees of freedom so as to be adjusted to place the surface being imaged substantially perpendicular with respect to the optical axis. In particular, the use of a pair of planar laser beams is disclosed which facilitate recognition of the angle of the surface being imaged with respect to the optical axis so that the parameters of focus, pitch and drift can be easily adjusted.

When objects being imaged are of an unknown, and in particular, of an irregular shape, the adjustment of the position of the object under optical observation as it is being imaged (a very large number of images may be taken of the surface with a certain amount of overlap to create a larger composite image) requires much time and effort to get the position right as the object is moved along some imaging path.

SUMMARY OF THE INVENTION

It is accordingly an object of the present invention to provide a method of imaging a surface of a three-dimensional object in which a relative displacement and orientation between the surface of the object and a camera used for imaging the surface is automatically manipulated in an accurate and efficient manner. More particularly, it is an object of the present invention to provide a method of imaging a surface of a three-dimensional object by automatically manipulating a relative displacement and orientation between the surface of the three-dimensional object and a camera used for imaging the surface by imaging a plurality of segments thereof with a predetermined angular orientation between the surface at the segments and an optical axis of the camera in which a first approximation of the shape of at least a portion of the object is determined before manipulating the relative displacement and orientation along an imaging path and imaging the segments of the surface at the predetermined angular orientation along the imaging path.

According to the invention, there is provided a method of imaging a surface of a three-dimensional object by automatically manipulating a relative displacement and orientation between the surface of a three-dimensional object and a camera used for imaging the surface by imaging a plurality of segments thereof with a predetermined angular orientation between the surface at the segments and an optical axis of the camera, the method comprising the steps of:

a) manipulating the relative displacement and orientation along a predetermined scanning path;

b) measuring a distance between the surface and the camera along the optical axis at a plurality of points over the scanning path;

c) determining a mathematical function approximating the surface over at least a portion of the scanning path;

d) calculating using the function desired relative displacements and orientations for the portion of the scanning path to obtain an imaging path, the predetermined angular orientation between the surface at the segments and an optical axis of the camera being on average better respected over the imaging path than over the scanning path;

e) manipulating the object through the relative displacement and orientation along the imaging path; and f) imaging the segments of the surface at the angular orientation along the imaging path.

Preferably, the method according to the invention further comprises before step (e) steps of:

manipulating the object through the calculated desired relative displacements and orientations obtained in step (d);

re-measuring the distance between the surface and the camera along the optical axis at a plurality of points over the imaging path;

re-determining a mathematical function approximating the surface over the imaging path taking into account the distance measurements for the plurality of points over the imaging path;

re-calculating using the re-determined function desired relative displacements and orientations along the imaging path, the predetermined angular orientation between the surface at the segments and an optical axis of the camera being on average better respected over the imaging path as a result of the re-calculating.

Preferably, the scanning path has fewer degrees of freedom than the imaging path. Preferably, the desired relative displacements and orientations for the imaging path are calculated such that the image segment overlap between adjacent image segments is substantially constant for all of the plurality of image segments.

BRIEF DESCRIPTION OF THE DRAWINGS

The invention will be better understood by way of the following detailed description of a preferred embodiment of the invention with reference to the appended drawings in which.

DETAILED DESCRIPTION OF THE PREFERRED EMBODIMENT

In the preferred embodiment, the object being imaged is a fired bullet which is being imaged for forensic analysis purposes. The method and apparatus for adjusting the position of a bullet being imaged and the method and apparatus for analyzing such images are set out in U.S. Pat. Nos. 5,379,106 and 5,390,108 respectively, the specifications of which are incorporated herein by reference.

Figure 1:
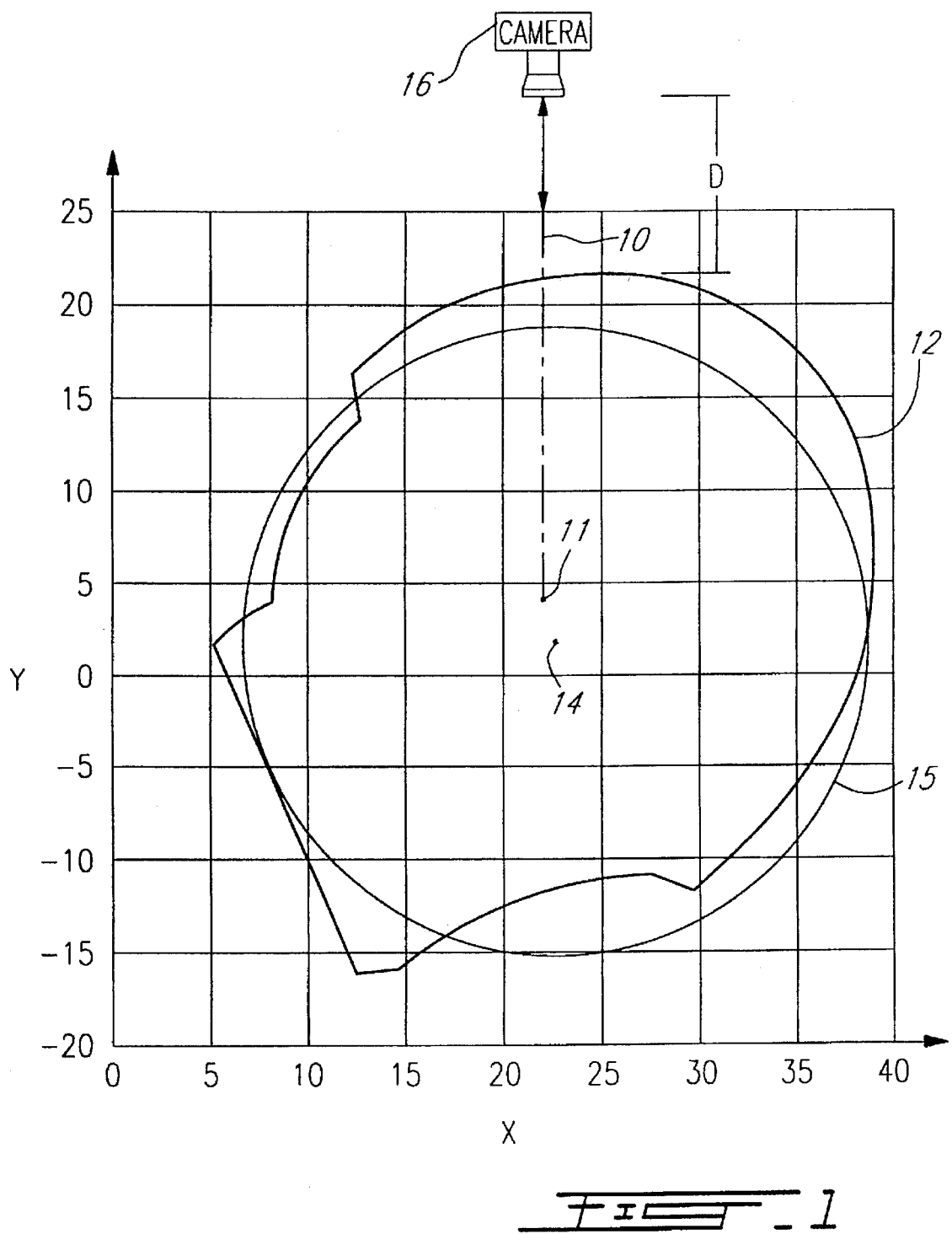
FIG. 1 illustrates schematically a mathematical function representing a cross-section of a deformed cylindrical object and of a best-fit circle approximating the mathematical function.
Figure 2:
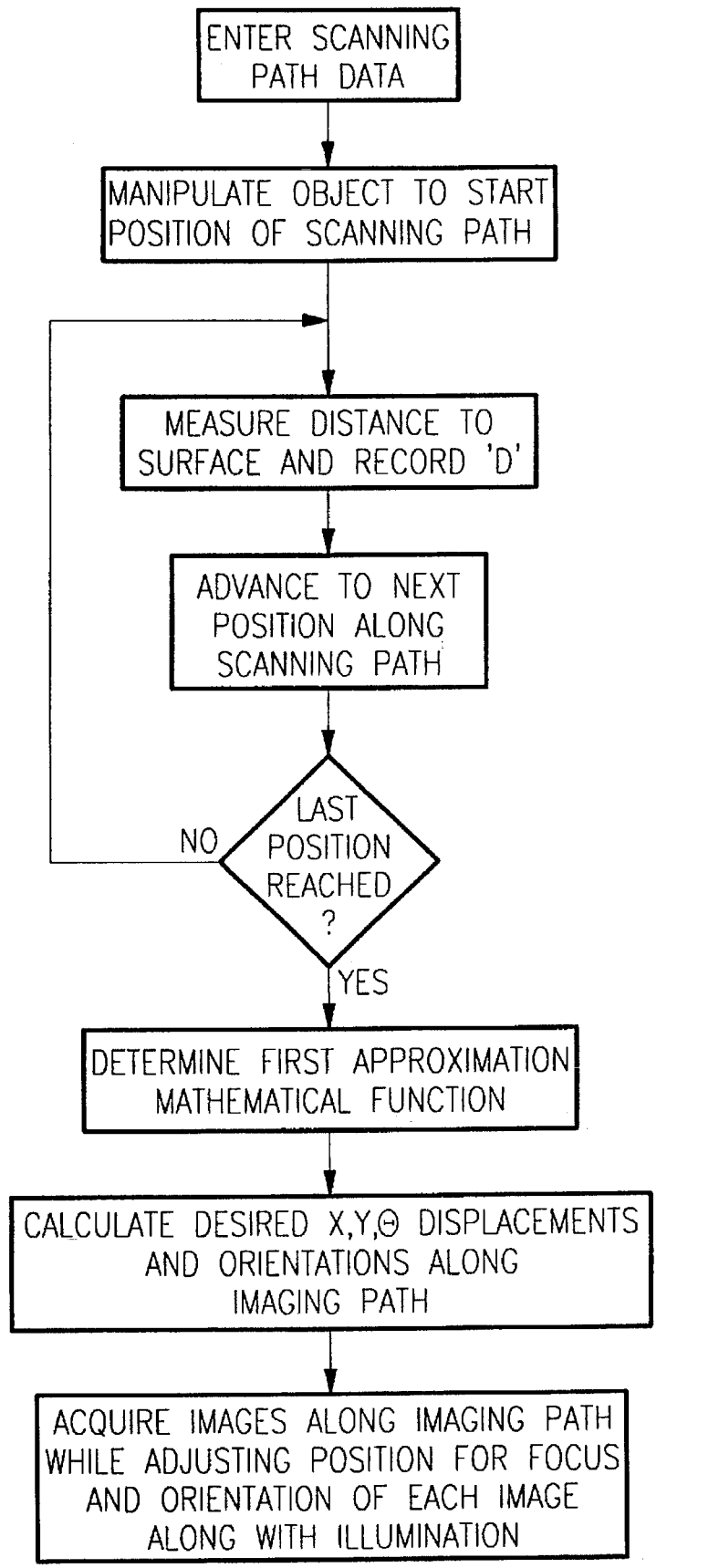
FIG. 2 is a flow diagram of the method according to the preferred embodiment when the object is to be imaged along a first approximation imaging path.

With reference to FIGS. 1 and 2, the method for obtaining the desired relative displacements and orientations for the imaging path will be described. In FIG. 1, there is shown a plot 12 of a mathematical function approximating the surface of a deformed fired bullet. To obtain this function, the physical bullet is mounted to a mounting about a central axis of rotation 11 as is known from and described in the mentioned U.S. Patents. In the embodiment of FIG. 1, the axis of rotation of the bullet is presumed to be sufficiently central with respect to the bullet surface, such that rotation of the bullet about axis 11 will serve as a scanning path around the entire peripheral surface of the bullet. Thus, the optical axis 10 of the camera passes through the center of rotation 11. In the first position, the distance D between the bullet surface and a fixed point of reference within the camera is measured. In the preferred embodiment, this measurement takes place by the focus adjustment which can be efficiently adjusted using a pair of planar beams projected onto the bullet surface as set out in U.S. Pat. No. 5,379,106 or using other auto focus techniques known in the art. The bullet is then rotated to the next position along the scanning path with the angular increment being approximately between 10° and 20°. At each position, the distance D is measured until the complete perophery has been examined.

Next, a first approximation mathematical function plotted as 15 in FIG. 1 is then determined from the relatively small set of measurements obtained as the object was moved through the scanning path. It is well known in the art to determine a mathematical function which will best fit a set of points, the "least squares" method being the most common. In the preferred embodiment, the first approximation is a circle 15 having center 14 which is a reasonable simple approximation of the shape of the deformed bullet. The bullet will require rotation about axis 11, and translation along the X axis to produce a rotation with axis 14 remaining in coincidence with axis 10. Translations along the Y axis are also calculated and carried out, and these displacements are focus adjustments of the camera.

In the preferred embodiment, imaging is not immediately undertaken using the path 15. Using the path 15 as the final imaging path (see FIG. 2) would be better than using the path defined by rotation about axis 11, but it would still require too many position adjustments for each image taken or would require allowing the images to be too out of focus with the bullet surface not normally being horizontal enough with respect to the optical axis. Therefore, the path 15 is used to obtain further measurements of the distance D, and in the case of the fired bullet a distance measurment is taken about every degree of rotation about axis 14. These extra distance measurements are taken for at least the portions of the bullet surface to be imaged.

As can be seen in FIG. 1, the measurements taken while the bullet is manipulated by rotation about the axis 14 are used to yield a mathematical function illustrated as 12 which shows some distortion to a bullet shape showing predominantly two groove regions. The object of the invention is to use the results of the these measurements to obtain the function defining the surface shape to calculate a series of desired relative displacements and orientations along an imaging path. Typically, the most interesting regions of interest on a fired bullet would be the two grooves on which surface striations would have a pattern which could be correlated from one fired bullet to the other from the same firearm.

The relative displacements and orientations may comprise simply X, Y and Θ (rotation about axis 11) steps for each frame along the imaging path for the portion of the bullet which is to be imaged. When calculating the relative displacements and orientations for each step along the imaging path, the overlap of the image frames or segments is also taken into consideration so that the exact desired image segment overlap is achieved over the imaging path.

In the preferred embodiment, if the mathematical function describing the bullet surface is not sufficiently accurate to permit the images to be taken while obtaining good focus and image surface orientation, the position of the bullet under optical observation may be adjusted. Thus, the parameters of focus (Y), rotation about axis 11 (Θ) and drift (X direction and possibly the Z direction into the page in FIG. 1) may be adjusted when imaging each segment along the imaging path, however, these adjustments in position will take place starting from the calculated desired relative displacement and orientation for each segment.

Figure 3:
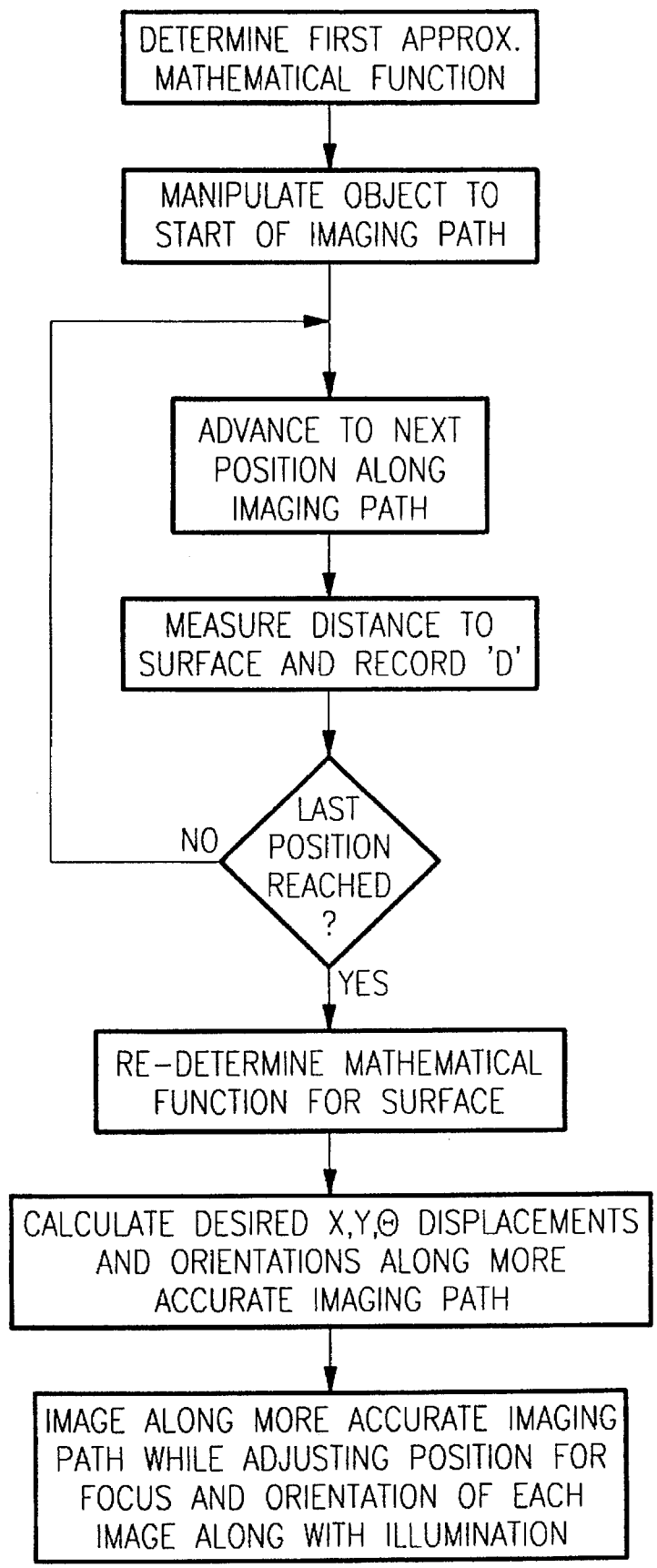
FIG. 3 illustrates the method according to the preferred embodiment when the object is to be imaged along an imaging path determined from a more accurate mathematical function describing the object surface.

In FIG. 3, there is shown a flow diagram illustrating the method according to the preferred embodiment.

In the preferred embodiment, the image received by camera 16 is analyzed to determine the quality of the illumination at each point over the imaging path. The lighting level is adjusted before recording each image to ensure consistency of illumination between images.

As can be appreciated, the groove illustrated at the bottom of FIG. 1 is a groove which, as a result of deformation of the bullet, is concave rather than convex. If the fired bullet is completely fragmented, a single flattened groove-containing portion may be the object being imaged. In such case, the scanning path is chosen to be a linear translation rather than a rotation. In the preferred embodiment, the scanning path about axis 11 has fewer degrees of freedom than the imaging path 12, although this is not necessarily the case. The scanning path is, however, a path which is relatively easily defined and entered into the equipment manipulating the relative displacement and orientation of the object.

Figure 4:
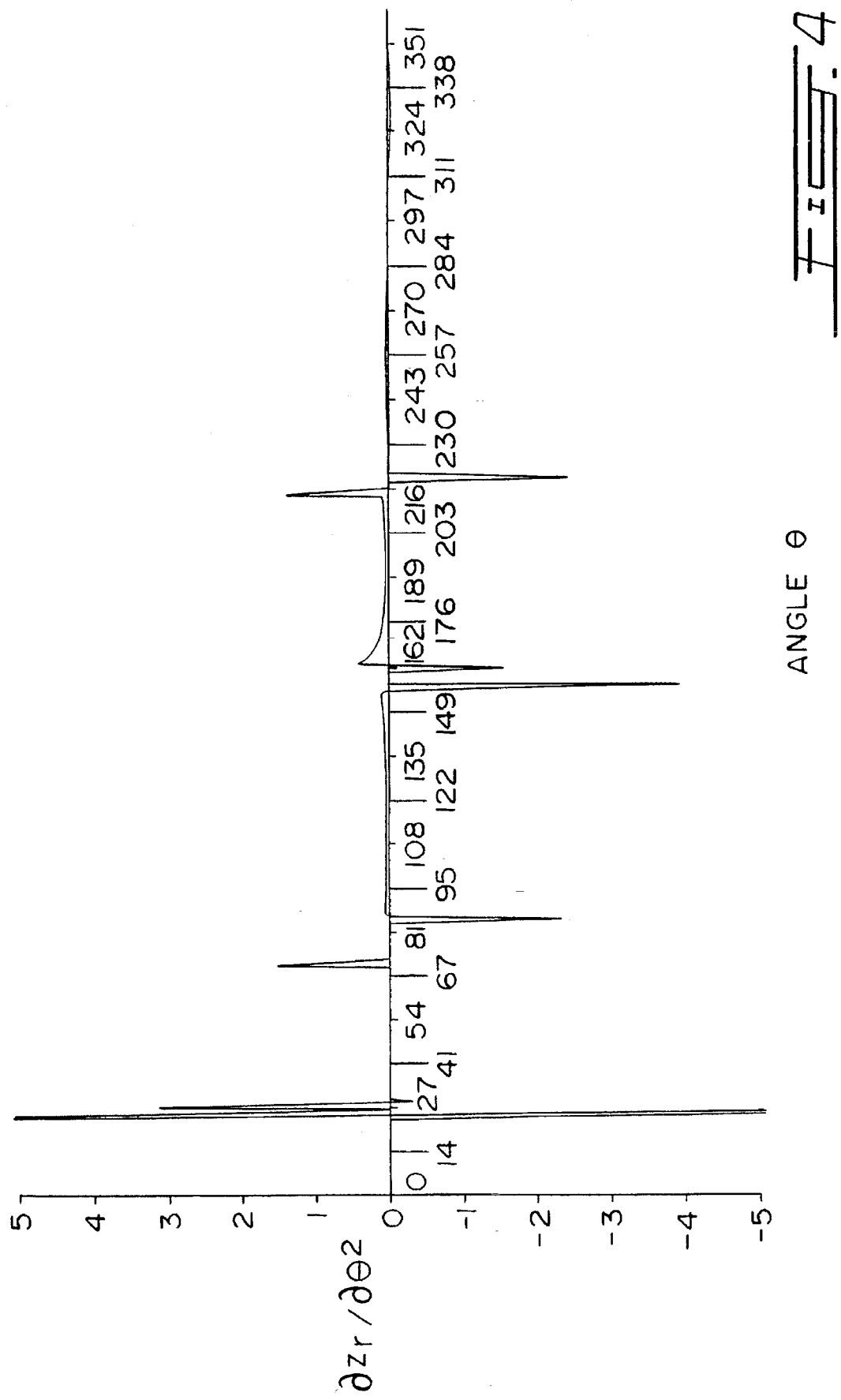
FIG. 4 illustrates a graph of the second derivative of the mathematical function representing the object surface which is used for shoulder detection and selection of the final imaging path.

In FIG. 4, there is shown a plot of the second derivative of the radius of the object about axis 14 with respect to the angle. This calculation is typically based on measurements of the surface with relatively high resolution (e.g. about every degree), and this determination can be used to facilitate automatic determination of the portion or the portions of the imaging path which are to be imaged.

Although it is preferred to use the camera 16 for the purposes of measuring distance D along the optical axis 10, it would be possible to use other means to carry out the measurement quickly and efficiently. In the preferred embodiment, the illumination of the object is substantially axi-symmetric with respect to the optical axis 10 and the surface of the object is normal to axis 10. In some cases, other imaging techniques in which the angle of the lighting or the angle of the optical axis with respect to the surface may be varied to obtain the desired information about the surface characteristics from the images.

I claim:

1. A method of imaging a surface of a three-dimensional object by automatically manipulating a relative displacement and orientation between the surface of a three-dimensional object and a camera used for imaging said surface by imaging a plurality of segments thereof with a predetermined angular orientation between said surface at said segments and an optical axis of said camera, the method comprising the steps of:

a) manipulating said relative displacement and orientation along a predetermined scanning path;

b) measuring a distance between said surface and said camera along said optical axis at a plurality of points over said scanning path;

c) determining a mathematical function approximating said surface over at least a portion of said scanning path;

d) calculating using said function desired relative displacements and orientations for said portion of said scanning path to obtain an imaging path, said predetermined angular orientation between said surface at said segments and an optical axis of said camera being on average better respected over said imaging path than over said scanning path;

e) manipulating said object through said relative displacement and orientation along said imaging path; and f) imaging said segments of said surface at said angular orientation along said imaging path.

2. The method as claimed in claim 1, further comprising before step (e) steps of:

manipulating said object through said calculated desired relative displacements and orientations obtained in step (d);

re-measuring said distance between said surface and said camera along said optical axis at a plurality of points over said imaging path;

re-determining a mathematical function approximating said surface over said imaging path taking into account the distance measurements for said plurality of points over said imaging path;

re-calculating using said re-determined function desired relative displacements and orientations along said imaging path, said predetermined angular orientation between said surface at said segments and an optical axis of said camera being on average better respected over said imaging path as a result of said re-calculating.

3. The method as claimed in claim 2, wherein said scanning path requires fewer degrees of freedom of movement than said re-determined mathematical function.

4. The method as claimed in claim 2, wherein said plurality of points over said imaging path re-measured is greater in number than said plurality of points over said scanning path measured.

5. The method as claimed in claim 1, wherein said distance is measured in said step (b) by projecting a pair of planar light beams referenced to said camera onto said surface, imaging said surface, and analyzing an image of said beams formed on said surface.

6. The method as claimed in claim 1, wherein said step of calculating said desired relative displacements and orientations for said imaging path comprises dividing up said mathematical function approximating said surface over said imaging path into pieces whose surface area corresponds to said segments less any desired image segment overlap, and calculating said desired relative displacements and orientations to correspond to said pieces.

7. The method as claimed in claim 2, wherein said step of re-calculating said desired relative displacements and orientations for said imaging path comprises dividing up said re-determined mathematical function approximating said surface over said imaging path into pieces whose surface area corresponds to said segments less any desired image segment overlap, and re-calculating said desired relative displacements and orientations to correspond to said pieces.

8. The method as claimed in claim 1, wherein step (e) further comprises adjusting a position and orientation of said object for proper focus and proper angular orientation.

9. The method as claimed in claim 1, wherein an illumination level of a light source illuminating said object for imaging purposes is detected and adjusted prior to imaging in said step (f).

10. The method as claimed in claim 2, wherein step (e) further comprises adjusting a position and orientation of said object for proper focus and proper angular orientation.

11. The method as claimed in claim 2, wherein an illumination level of a light source illuminating said object for imaging purposes is detected and adjusted prior to imaging in said step (f).

12. The method as claimed in claim 1, wherein said object is a fired bullet.

13. The method as claimed in claim 2, wherein said object is a fired bullet.

14. The method as claimed in claim 13, wherein said fired bullet is a fragment of a fired bullet, and said scanning path is substantially linear.

15. The method as claimed in claim 13, wherein said scanning path is rotation about a center axis of a mounting for said bullet, said determined function describes rotation about a corrected center axis, and said re-determined function describes both rotation and translations.

16. The method as claimed in claim 4, wherein said object is a fired bullet, said scanning path is rotation about a center axis of a mounting for said bullet, and further comprising a step of calculating a derivative of said re-determined mathematical function to determine positions of land and groove boundaries on said fired bullet.

17. The method as claimed in claim 1, wherein said predetermined angular orientation is normal to said surface.

18. The method as claimed in claim 17, wherein an illumination of said object is substantially axi-symmetric with respect to said optical axis.

19. The method as claimed in claim 7, wherein said step (e) comprises rotating and translating said object for each one of said pieces.

20. The method as claimed in claim 6, wherein step (e) further comprises analysing an image obtained using said camera to adjust a position and angular orientation of said object for proper focus with said object surface substantially normal with respect to said optic axis and said pieces centered within said image, and to adjust an illumination level of a light source illuminating said object.

* * * * *